United States Patent [19]

Ogoshi et al.

[11] Patent Number: 5,358,399
[45] Date of Patent: Oct. 25, 1994

[54] CUTTER HOLDER DEVICE IN A PELLETIZER

[75] Inventors: Syunji Ogoshi; Yasuhiko Ishida, both of Hiroshima, Japan

[73] Assignee: The Japan Steel Works, Ltd., Tokyo, Japan

[21] Appl. No.: 43,843

[22] Filed: Apr. 7, 1993

[30] Foreign Application Priority Data

Apr. 9, 1992 [JP] Japan .................................. 4-088727

[51] Int. Cl.$^5$ .............................................. B29C 47/00
[52] U.S. Cl. ......................... 425/311; 425/DIG. 230; 464/158
[58] Field of Search ...................... 464/156, 158, 159; 425/310, 311, 313, 67, DIG. 230

[56] References Cited

U.S. PATENT DOCUMENTS

| | | | |
|---|---|---|---|
| 3,095,713 | 7/1963 | Sahlmann et al. | 464/168 |
| 3,196,487 | 7/1965 | Snelling | 425/313 |
| 3,266,090 | 8/1966 | Gosney | 425/313 |
| 3,292,212 | 12/1966 | Pomper | 425/67 |
| 3,984,999 | 10/1976 | Kopp | 464/158 |
| 4,073,160 | 2/1978 | Perret | 464/158 |
| 4,874,307 | 10/1989 | Comper | 425/313 |
| 4,969,371 | 11/1990 | Allen | 464/158 |
| 5,059,103 | 10/1991 | Bruckmann et al. | 425/311 |
| 5,190,768 | 3/1993 | Ishida et al. | 425/313 |

FOREIGN PATENT DOCUMENTS 1577411 10/1980 United Kingdom .
2043207 10/1980 United Kingdom .

Primary Examiner—Jay H. Woo
Assistant Examiner—Robert B. Davis
Attorney, Agent, or Firm—Sughrue, Mion, Zinn, Macpeak & Seas

[57] ABSTRACT

Disclosure is a cutter holder device for a pelletizer in which a cutter shaft is coupled to a cutter holder through a crowned involute spline gear and an elastic member so that cutter blades are kept in close contact with a die surface. In the cutter holder device, the cutter shaft is coupled to the cutter holder through the crowned involute spline gear and the elastic member, so that, even when a squareness between the cutter shaft and the die surface is lowered, all cutter blades are held in close contact with a die surface, whereby the resultant pellets are satisfactory and uniform in configuration.

4 Claims, 2 Drawing Sheets

CUTTER HOLDER DEVICE IN A PELLETIZER

BACKGROUND OF THE INVENTION

1. Field of the Invention

This invention relates to a cutter holder device in a pelletizer, and more particularly to a novel improvement thereof that a cutter shaft is coupled to a cutter holder through a crowned involute spline gear and an elastic member so that cutter blades are held completely in contact with a die even when the pelletizer is continuously operated at a temperature condition characterized by high temperature, variation of temperature during operation and extended operation.

2. Description of the Prior Art

There are a variety of cutter holder devices of this type. A typical one of the cutter holder devices, which is popularly employed, is as shown in FIG. 2.

In FIG. 2, reference numeral 1 designates a cutter shaft. A cutter holder 3 substantially T-shaped in section is coupled to the cutter shaft 1 through a key 10.

A support member 5 is secured to the front end face 1a of the cutter shaft 1 with a bolt 4. The cutter holder 3 is positioned by means of the support member 5. More specifically, the rear end face 3a of the cutter holder 3 is abutted against the shoulder 1b of the cutter shaft 1 with the support member 5.

The cutter holder 3 has a mounting peripheral portion 3b, to which a plurality of cutter blades 6 are secured with mounting bolts 7. The cutter blades 6 are slidably rotated while being pushed against the die surface 8a of a die 8.

When the cutter blades 6 are slidably rotated on the die surface 8a through the cutter holder 3 by the cutter shaft 1, a molten resin discharged from the die 8 is cut into pellets by the cutter blades 6.

The conventional cutter holder device designed as described above suffers from the following difficulties:

In general, in order to obtain pellets satisfactory and uniform in configuration, the squareness between the cutter shaft and the die surface must be considerably high in accuracy. For this purpose, the cutter shaft is joined with the cutter holder by fitting the former into the latter with no play therebetween, and the key is used to transmit torque from the cutter shaft to the cutter holder. On the other hand, the pelletizer is operated at the temperature condition specified by high temperature and, variation of temperature during operation, and therefore the cutter shaft may be adversely affected in balance by thermal expansion, or when the pelletizer is operated for a long period of time, the support member supporting the cutter shaft may be worn out, the squareness between the cutter shaft and the die surface is lowered; that is, a portion which is not brought into contact with the cutter blades is partially developed on the die surface on which the cutter blades are slidably moved. As a result, the conditions of cutting the molten resin discharged from the die are variable, which makes it considerably difficult to obtain pellets satisfactory and uniform in configuration.

SUMMARY OF THE INVENTION

Accordingly, an object of this invention is to eliminate the above-described difficulties. More specifically, an object of the invention is to provide a cutter holder device for a pelletizer in which a cutter shaft is coupled to a cutter holder through a crowned involute spline gear and an elastic member, so that the cutter blades are held completely in contact with the die even when the pelletizer is operated at a temperature condition characterized by high temperature, variation of temperature during operation or extended operation.

The foregoing object of the invention has been achieved by the provision of a cutter holder device for a pelletizer in which cutter blades are secured to a cutter holder connected to a cutter shaft, and resin is cut with the cutter blades pushed against a die, which, according to the invention, comprises: a crowned involute spline gear for transmitting torque from the cutter shaft to the cutter holder; and an elastic member secured to the front end face of the cutter shaft with a bolt in such a manner that the elastic member is joined with the cutter holder.

Further, it is possible to directly fix the elastic member and the cutter holder.

Further more in the cutter holder device, the elastic member is disk-shaped, and has a thin annular portion.

In the cutter holder device according to the invention, a torque transmitting mechanism, namely, the cutter holder is held to the cutter shaft in order to absorb the deviation from squareness between the cutter shaft and the die surface by the crowned involute spline gear and to support the crowned involute spline gear absorbing the deviation from squareness between the cutter shaft and the die surface by the elastic member. The crowned involute spline gear provided between the cutter holder and the cutter shaft and the elastic member provided on the front end face of the cutter shaft absorb the misalignment and the deviation in squareness of the cutter shaft.

As a result, under the temperature condition characterized by high temperature, variation of temperature and unevenness of temperature and the support member supporting the cutter shaft being worn out, the cutter holder follows the die surface to maintain squareness between the cutter holder and the die surface. Therefore, no gap is formed between the die surface and of the cutter blades. Hence, the resultant pellets are satisfactory and uniform in configuration.

DETAILED DESCRIPTION OF THE PREFERRED EMBODIMENTS

A preferred example of a cutter holder device in a pelletizer according to this invention will be described with reference to the accompanying drawings in detail.

Figure 1:
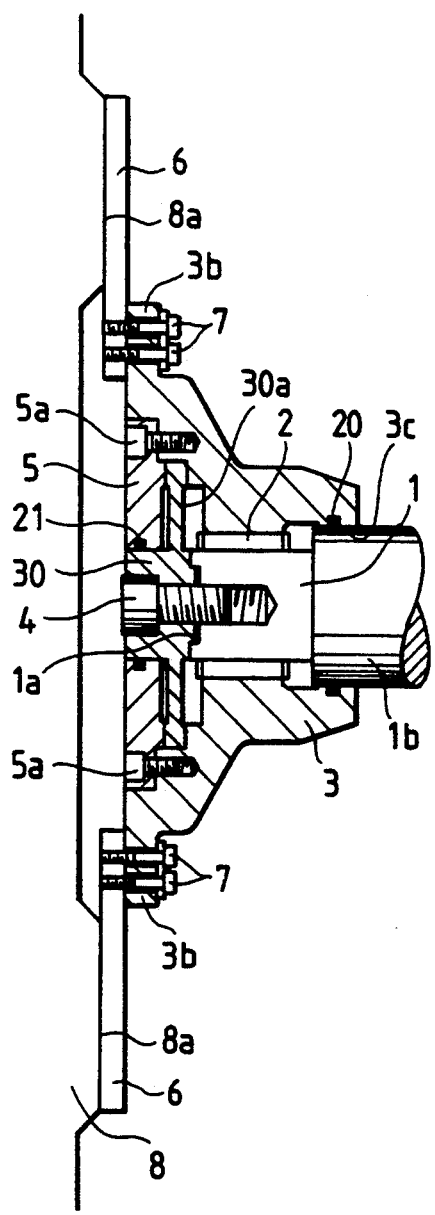
FIG. 1 is a sectional view showing a cutter holder device in a first embodiment of a pelletizer according to the present invention.
Figure 2:
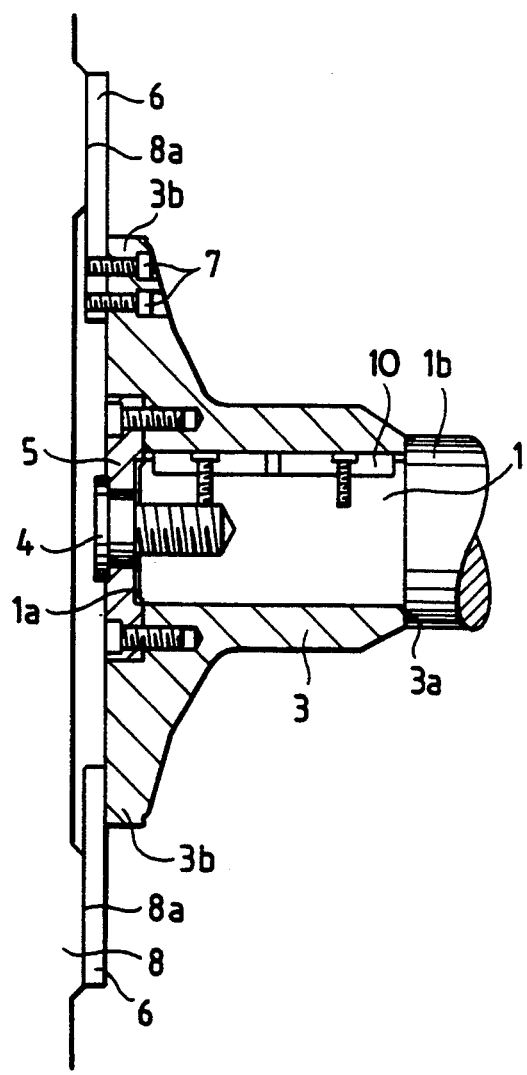
FIG. 2 is a sectional view showing a conventional cutter holder device in a pelletizer.

The cutter holder device according to the invention is as shown in FIG. 1, in which parts corresponding functionally to those which have been described with reference to FIG. 2 are therefore designated by the same reference numerals or characters.

Figure 3:
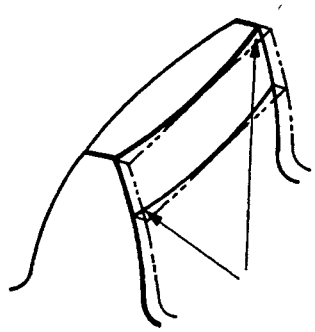
FIG. 3 is an enlarged view showing a crown involute spline gear which is employed in the present invention.

In FIG. 1, reference numeral 1 designates a cutter shaft. A cutter holder 3 substantially T-shaped in section is coupled through a crowned involute spline gear 2 to the cutter shaft 1 so that the crowned involute spline gear 2 rotates with the cutter shaft 1. The present invention employs the crowned involute spline gear 2 having a tooth as shown in FIG. 3. A crowning process is applied to a side of the cutter shaft at a coupling portion defined between the cutter holder and the involute spline gear of the cutter shaft.

The cutter holder 3 has an engaging hole 3c in the rear end portion, while the cutter shaft 1 has a shoulder 1b at the end which is positioned behind the crowned involute spline gear 2. The cutter holder 3 is engaged through the engaging hole 3c with the cutter shaft 1 in such a manner that there is a gap between the engaging hole 3c and the shoulder 1b. Water-proof means, namely, an O-ring 20 is set in the gap so that the pelletizer may be used in water. The crowned involute spline gear 2 is of an aligning type; that is, it acts to prevent the mis-alignment of the cutter shaft 1 with respect to the cutter holder 3.

An elastic member 30 acting like a leaf spring is fixedly secured to the front end face 1a of the cutter shaft with a bolt 4. Of course, it is capable to directly fix the elastic member 30 and the cutter shaft 1 by a screw. The elastic member 30 is substantially disk-shaped, comprising a cylindrical protrusion extended forwardly from the center and a thin annular portion 30a around the cylindrical protrusion. A plate-shaped support member 5 is set on the front side of the elastic member 30. More specifically, the support member 5 is secured to the cutter holder 3 with fixing screws 5a in such a manner that the outer peripheral portion of the elastic member 30 is held between the support member 5 and the cutter holder 3.

Thus, the cutter holder 3 is coupled and supported by the cutter shaft 1 through the crowned involute spline gear 2 and the elastic member 30. When the support member 5 is secured to the cutter holder 3 in the above-described manner, the inner peripheral portion of the support member 5 forms a gap with the outer surface of the cylindrical protrusion of the elastic member 30. An O-ring 21 is set in the gap so that the pelletizer may be used in water.

The cutter holder 3 has a mounting peripheral portion 3b, to which a plurality of cutter blades 6 are secured with mounting bolts 7 in such a manner that the cutter blades 6 are rotated while being kept in slide contact with the die surface 8a of a die 8.

The elastic member 30 maintains the reaction force, which is received by the cutter holder 3 through the cutter blades 6 due to the elastic member 30 being fixed to the cutter holder 3 by the support member 5.

The cutter holder 3 is flexibly connected to the cutter shaft 1 through the crowned involute spline gear 2 and the elastic member 30 so that the cutter holder 3 could be inclined with respect to a rotation axis of the cutter shaft 1. In other words, the cutter holder is designed to angle with the rotation axis of the cutter shaft. Moreover, the O-rings 20 and 21 function as cushion materials when the cutter holder 3 is inclined.

Owing to the above-described arrangement of the cutter holder device even when the squareness between the cutter shaft and the die is lowered, the cutter holder 3 is movable with respect to the cutter shaft 1 with the aid of both the elastic member 30 acting like a leaf spring and the crowned involute spline gear 2 functioning as aligning means, and therefore the cutter blades 6 are turned while being held in close contact with the die surface 8a.

Thus, in water or in air, the cutter blades 6 are turned through the cutter holder 3 by the cutter shaft 1 while being kept in slide contact with the die surface 8a. Therefore, the conditions of cutting the molten resin extruded from the die surface 8a are maintained constant, and therefore the resultant pellets are satisfactory and uniform in configuration.

Figure 4:
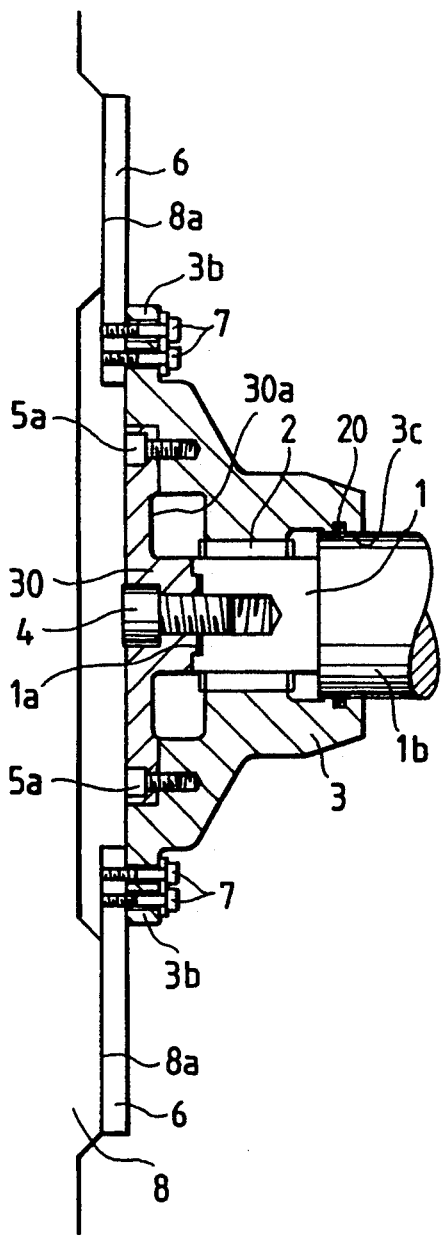
FIG. 4 is a sectional view showing a cutter holder device in a second embodiment of a pelletizer according to the present invention.

In FIG. 4 is shown another embodiment of the present invention. This embodiment is different from the embodiment shown in FIG. 1 in that the elastic member 30 is directly connected to the cutter holder 3 by the screws 5a in the second embodiment. Namely, the support member 5 is omitted. Of course, in this construction, the advantage of the present invention is enjoyed.

The cutter holder device designed as described above has the following effects or merits:

In the cutter holder device according to the invention, the crowned involute spline gear and the elastic member are provided between the cutter holder and the cutter shaft. Therefore, even when the squareness between the cutter shaft and the die surface is lowered, the crowned involute spline gear and the elastic member act to keep the cutter blades completely in close contact with the die surface. That is, under any temperature conditions and the wearing out of the support members, no gap is formed between the die surface and the cutter blades, and therefore the resultant pellets are satisfactory and uniform in configuration.

What is claimed is:

1. A cutter holder device in a pelletizer comprising:
   a cutter holder connected to a cutter shaft;
   a crowned involute spline gear for transmitting torque from said cutter shaft to said cutter holder, said crowned involute spline gear being positioned between said cutter holder and said cutter shaft; and
   an elastic member secured to a front end face of said cutter shaft in such a manner that said elastic member is joined with said cutter holder.

2. A cutter holder device as claimed in claim 1, further comprising:
   an O-ring mounted between said cutter holder and said cutter shaft.

3. A cutter holder device as claimed in claim 1, further comprising:
   support member secured on an end portion of said cutter holder through said elastic member.

4. A cutter holder device as claimed in claim 3, further comprising:
   a pair of O-rings respectively mounted in a first position defined between said cutter holder and said cutter shaft and a second position defined between said support member and said elastic member.

* * * * *